Feb. 19, 1946.   G. SLAVICEK   2,395,349
WAGON ELEVATOR
Filed April 13, 1944   2 Sheets-Sheet 2
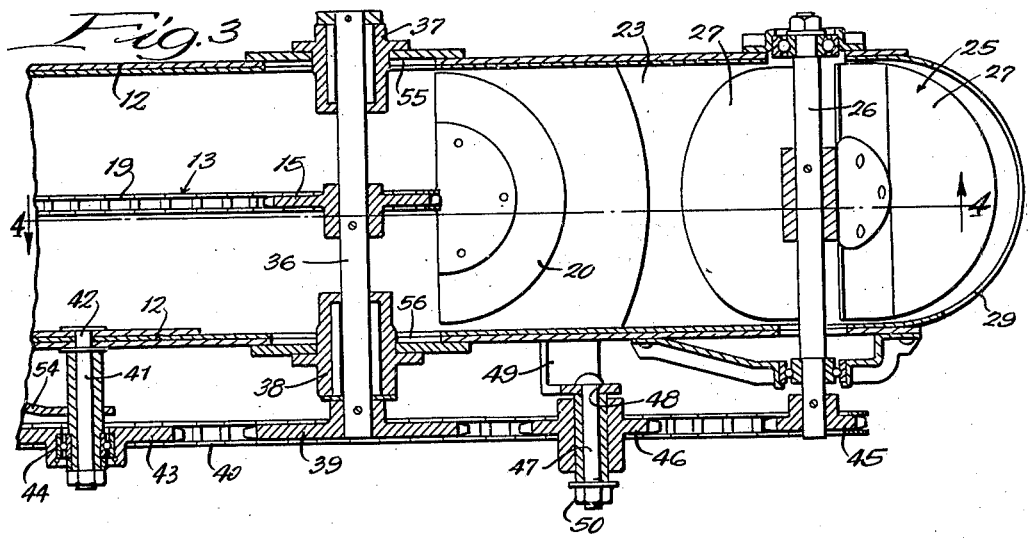
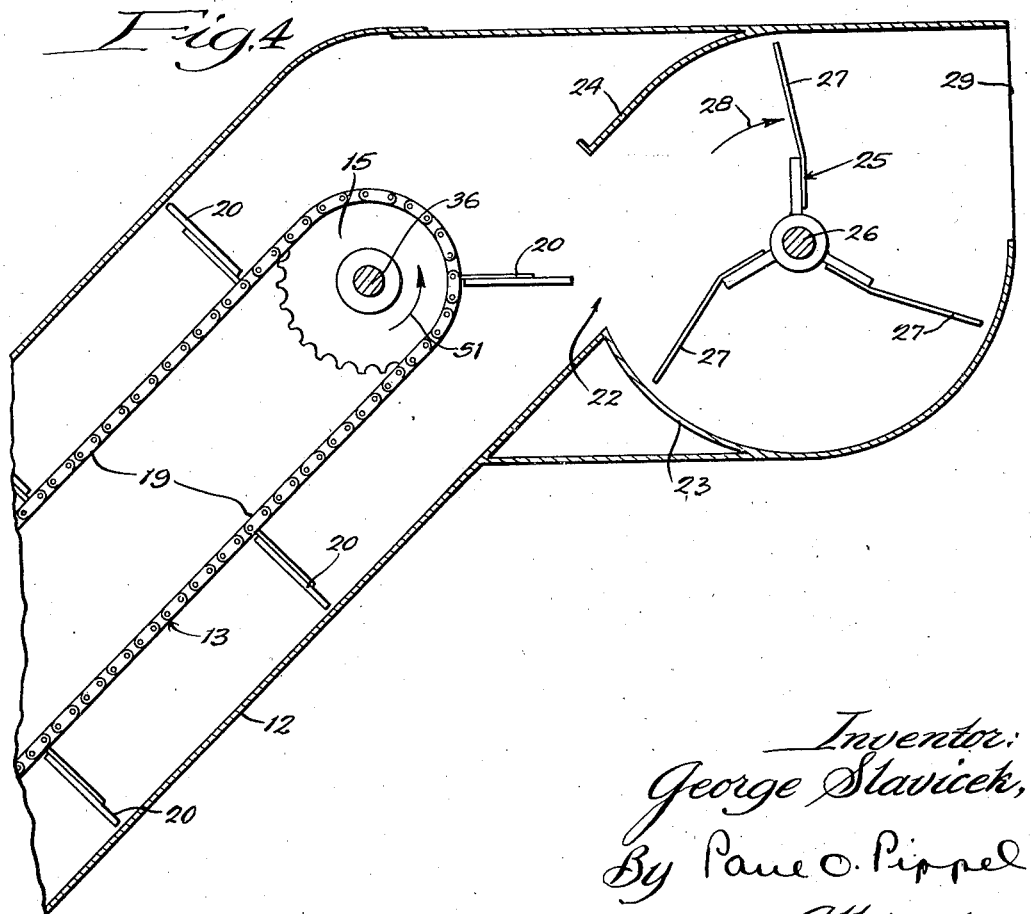
Inventor:
George Slavicek,
By Paul O. Pippel
Attorney.

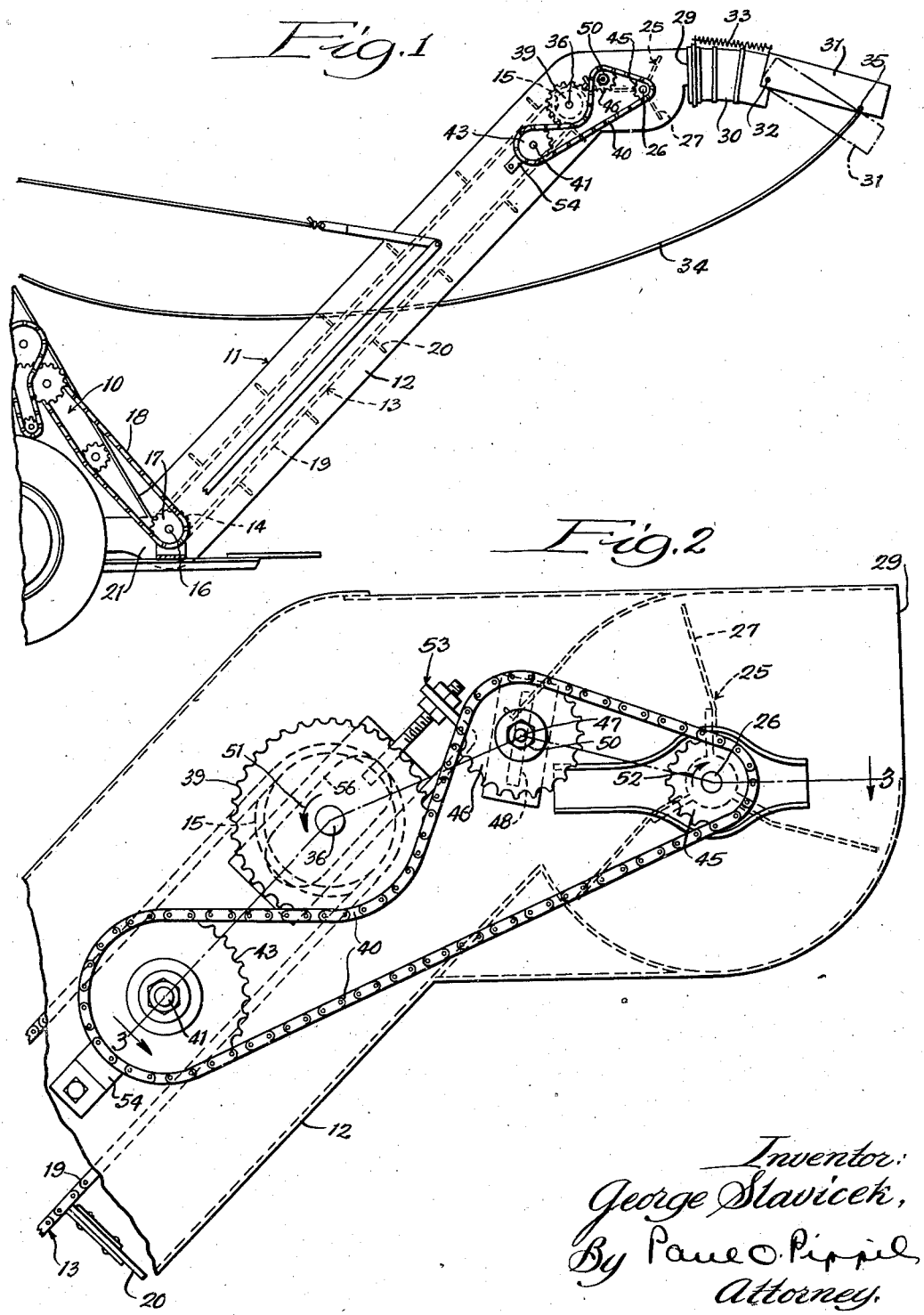

Patented Feb. 19, 1946

2,395,349

UNITED STATES PATENT OFFICE 2,395,349

WAGON ELEVATOR

George Slavicek, Berwyn, Ill., assignor to International Harvester Company, a corporation of New Jersey Application April 13, 1944, Serial No. 530,811

2 Claims. (Cl. 198—103)

This invention relates to a new and improved wagon elevator and has for one of its principal objects the provision of means for carrying cut ensilage from an ensilage harvester to a wagon, and more particularly a means for applying ensilage to the wagon uniformly over its entire area.

Heretofore, wagon elevators of all types carried material upwardly to a point above a wagon and thereupon dropped the material at one point in the wagon. This point, generally the center of the wagon, became the peak of a pile in the wagon which would soon assume a far greater height than the sides of the wagon, and thus a limit would be placed on the wagon capacity before the wagon was completely filled. Of course, some materials would tend to slide down and outwardly from this peak and fill the far corners of the wagon, but this is not true of freshly cut ensilage which invariably stays exactly where is is dropped. It is obvious, therefore, that the sides and ends of the wagon are not filled at all, yet the wagon becomes so loaded in its center that it is impossible to put in any more ensilage without fear of losing it over the sides of the wagon.

A particular object of the present invention is to overcome the deficiencies of prior ensilage wagon elevators and to employ a means on the elevator to throw ensilage to all parts of the wagon.

Another and still further important object of this invention is to provide a wagon elevator for ensilage and a means for throwing the ensilage from the elevator at a greater velocity than the speed of the elevator.

Other and further important objects will become apparent from the disclosures in the following specification and accompanying drawings, in which:

Figure 1 is a side elevation of the rear portion of an ensilage harvester including the wagon elevator;

Figure 2 is an enlarged detail of the upper portion of the wagon elevator shown in Figure 1;

Figure 3 is a sectional view taken on the line 3—3 of Figure 2; and

Figure 4 is a sectional view taken on the line 4—4 of Figure 3.

As shown in the drawings, the reference numeral 10 indicates generally an ensilage harvester, the rear portion only being shown. The ensilage harvester may be of the conventional type which cuts the standing stalks and thereupon chops them into short lengths at which point they are carried by means of a wagon elevator 11 to a trail-behind wagon (not shown).

The wagon elevator consists of an oval housing 12 through which extends a conveyer 13. The conveyer 13 includes a pair of spaced sprockets 14 and 15 located at the lower and upper portions of the elevator, respectively. The sprocket 14 is mounted and fastened to a shaft 16. The shaft 16 carries at its outer end a sprocket 17 which is adapted to be driven from the ensilage harvester drive means through the chain 18. The sprockets 14 and 15 are centrally alined within the oval elevator housing 12 and are interconnected by a chain 19. As best shown in Figure 3, the chain 19 carries at regular intervals outwardly extending semicircular elevator flaps 20. As shown in Figure 4, the flaps 20 are of such a size and shape that they closely conform to the shape of the upper and lower portions of the oval elevator housing 12. The cut ensilage is dropped in the space designated by the numeral 21 at the rear end of the ensilage harvester 10 at which point the returning elevator flaps 20 in the upper section of the oval elevator come down and scoop up the ensilage and carry it up the elevator along the lower arcuate portion of the oval-shaped elevator. As the ensilage reaches the top of the elevator, it is dropped off the flaps 20 at approximately the point designated by the numeral 22. At this point 22, there is an opening defined by an auxiliary housing 23 and a partition 24.

The auxiliary housing 23 encloses a paddle wheel 25 which is mounted on a shaft 26 and has radially extending paddles 27. The paddle wheel 25 rotates in a clockwise direction, as viewed in Figure 4 and indicated by the arrow 28. It is apparent, therefore, that as the ensilage is dropped from the conveyer flaps 20 of the elevator 13 at the point 22, the speedily rotating paddle wheel 25 will pick up the ensilage and throw it outwardly against the partition 24. The partition is so positioned that it holds the ensilage within the confines of the paddle wheel 25 and is carried around until it reaches the opening 29.

As shown in Figure 1, a swiveling conduit 30 is attached to the auxiliary paddle wheel housing 23 around its opening 29. A deflector hood 31 is pivoted at 32 on the conduit 30 and is resiliently maintained in its uppermost position by means of a spring 33. A trailing wagon (not shown) is adapted to receive harvested ensilage thrown from the elevator 11. The uppermost position of the deflector hood 31 has an inclination of such a degree that ensilage under a relatively high velocity will be thrown to the rear end of the wagon. A rope 34 is attached to the deflector hood 31 at 35 and proceeds forwardly to a position adjacent the operator of the ensilage harvester. When the operator discovers that the rear end of the wagon is filled, he pulls forwardly on the rope 34 whereupon the deflector hood 31 assumes the dashed-line position as shown in Figure 1, thus deflecting the fast-moving ensilage to a resting place in the forward end of the trailing wagon. The trailing wagon may be pulled directly behind the ensilage harvester, in which event the deflector hood 31 alone will be sufficient in obtaining an even distribution of ensilage in the wagon. However, it is oftentimes desired to have the trailing wagon offset from the line of ensilage harvester travel in order that the tractor pulling the harvester and wagon will not have too great a load on one side thereof. When the trailing wagon is offset as just described, the swivel conduit 30 is manually twisted to the desired angle and will thereupon throw the cut ensilage sidewardly into the wagon, and this may be deflected forwardly or rearwardly by manipulation of the deflector hood 31 as desired.

It is particularly important that the paddle wheel 25 rotate at a greater speed than the elevator in order that the ensilage may be thrown at sufficient velocity to permit the deflector hood to distribute ensilage over the entire surface of the wagon. The upper sprocket 15 of the elevator conveyer 13 is mounted on a shaft 36 which is journaled in bearings 37 and 38 in the sides of the elevator housing 12. The outer end of the shaft 36 carries a relatively large sprocket 39 and is adapted, through the medium of a chain 40, to transmit driving power from the conveyer 13 to the paddle wheel 25. A stub shaft 41 is affixed to the elevator housing wall 12 as shown at 42 and is adapted to journally support a sprocket 43 on a ball bearing 44. The stub shaft 41 is further reenforced by a bracket 54. The outer end of the shaft 26 of the paddle wheel 25 carries a sprocket 45 in the same plane with the sprockets 39 and 43. An idler sprocket 46 is journally mounted on an adjustably positioned stub shaft 47 within an elongated slot 48 in a supporting bracket 49 affixed to the elevator housing 12. The shaft 47 is shiftable within this slot 48 by means of a nut 50 threadedly engaging the end of the shaft 47. The nut 50 is adapted to compress a sleeve-like spacer 50' against the bracket 49. The nut may be loosened and then tightened when the sprocket is in the desired position. The sprocket 45 is relatively small compared to the sprocket 39, and thereupon the speed of the shaft 26 is greatly multiplied over the speed of the shaft 36. The idler sprockets 43 and 46 are for the purpose of maintaining the chain 40 under the proper tension and mainly to cause a change in direction of rotation of the shafts 36 and 26. As viewing the device in Figure 2, the shaft 36 rotates in a counter-clockwise direction as indicated by the arrow 51, and the shaft 26 rotates in a clockwise direction as indicated by the arrow 52.

An adjustable means 53, as shown in Figure 2, is adapted to shift the position of the shaft 36 and thereupon loosen or tighten the elevator conveyer 13 as necessary. Opposed openings 55 and 56 in the elevator housing 12 permit shifting of the bearings 37 and 38, respectively, when the adjustment means 53 is operated.

It is apparent that herein is provided a novel wagon elevator, and the intention is to limit the invention only within the scope of the appended claims.

What is claimed is:

1. A wagon elevator comprising an inclined housing, a pusher-flight-type conveyer in said inclined housing running in an upward direction on its under side, a horizontal extension at the top of said inclined housing, the juncture end of the horizontal portion having a substantially circular depending underside, a fan journaled for rotation in the circular portion of said horizontal extension and in a reverse direction from that of the conveyer, and means for driving said fan at a greater rotational speed than the linear speed of the conveyer whereby material carried up by the conveyor is dropped in the depending circular housing and there taken back up over the depending housing by the fan and then the material is thrown out the top of the horizontal extension.

2. A wagon elevator comprising an inclined housing, a conveyer in said inclined housing, a horizontal extension at the top of said inclined housing, the juncture end of the horizontal portion having a circular underside, an arcuate baffle within said horizontal portion of the housing depending from the top thereof in such a position to cooperate with the circular underside to form a substantially complete circular chamber having an inlet from the conveyer beneath the baffle and an outlet at the end of said horizontal portion of the housing, a fan journaled for rotation in the circular chamber adapted to carry material up from the conveyor and over the fan against said arcuate baffle, and means for driving said fan at a greater rotational speed than the linear speed of the conveyer.

GEORGE SLAVICEK.